United States Patent Office 3,644,525
Patented Feb. 22, 1972

3,644,525
N-ARALKYL-AND-ARYLHYDROXYALKYL-PRO-
PIOPHENONES AND THE SALTS THEREOF
Kurt Thiele, Beethovenstrasse 6,
Frankfurt am Main, Germany
No Drawing. Filed Mar. 17, 1969, Ser. No. 807,945
Int. Cl. C07c 91/16, 91/26
U.S. Cl. 260—570.5 C         17 Claims

ABSTRACT OF THE DISCLOSURE

Compounds are prepared having the formula

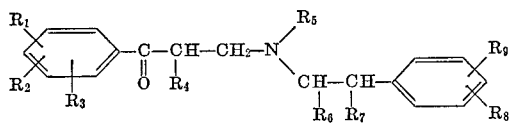

where $R_1$, $R_2$ and $R_3$ are the same or different and are hydrogen, chlorine, hydroxyl, alkoxy or nitro, $R_4$ is hydrogen, methyl or ethyl, $R_5$ is hydrogen or alkyl, $R_6$ is hydrogen or methyl, $R_7$ is hydrogen or hydroxyl, $R_8$ is hydrogen, alkyl, alkoxy, hydroxyl or halogen and $R_9$ is hydroxyl or alkyl with at least two carbon atoms. The compounds can be made in the form of their optically active isomers or diastereoisomers, salts or quaternary ammonium salts.

---

The present invention relates to new compounds of the Formula I

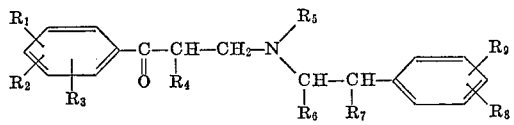

wherein $R_1$, $R_2$ and $R_3$ are the same or different and are hydrogen, chlorine, hydroxyl, alkoxy or nitro, $R_4$ is hydrogen, methyl or ethyl, $R_5$ is hydrogen or alkyl, $R_6$ is hydrogen or methyl, $R_7$ is hydrogen or hydroxyl, $R_8$ is hydrogen, alkyl, alkoxy, hydroxyl or halogen and $R_9$ is hydroxyl or alkyl with at least two carbon atoms. When $R_1$, $R_2$, $R_3$ or $R_8$ is alkoxy usually the alkoxy group is a lower alkoxy having 1 to 5 carbon atoms such as methoxy, ethoxy, propoxy, butoxy or pentoxy. When $R_5$ or $R_8$ is alkyl it is usually lower alkyl of 1 to 5 carbon atoms such as methyl, ethyl, propyl, isopropyl, butyl, sec. butyl, isobutyl, t. butyl or amyl. When $R_9$ is alkyl of at least two carbon atoms it is usually lower alkyl of 2 to 5 carbon atoms such as ethyl, propyl, isopropyl, butyl, isobutyl, sec. butyl, t. butyl or amyl.

Examples of compounds within the present invention are

β-[methyl-2-(4-hydroxyphenyl)-2-hydroxyethylamino]-
propiophenone,
β-[2-(3-dihydroxyphenyl)-2-hydroxyethylamino]-
propiophenone,
β-[2-(3,4-dihydroxyphenyl)-2-hydroxyethylamino]-
4-methoxypropiophenone,
β-[2-(3,4-dihydroxyphenyl)-2-hydroxyethylamino]-
2-hydroxypropiophenone,
β-[ethyl-2(3-methyl-4-hydroxyphenyl)-2-hydroxyamino]-
3-nitropropiophenone,
β-[2-(2-chloro-4-hydroxyphenyl)-1-methylethylamino]-
propiophenone,
β-[2-(3-ethoxy-4-hydroxyphenyl)-ethylamino]propio-
phenone,
β-[4-tert. butylphenyl)-2-hydroxyethylamino]-3-me-
thoxy propiophenone,
β-[2-(4-tert. butylphenyl)-2-hydroxyethylamino]-4-hy-
droxypropiophenone,
β-[2-(4-isopropylphenyl)-2-hydroxyethylamino]-3-me-
thoxylpropionphenone,
β-[ethyl-2-(3,4-hydroxyphenyl)-2-hydroxyethylamino]-
propiophenone.

The compounds of the invention which contain optically active carbon atoms are usually obtained as racemates which can be separated into their optically active isomers or diastereoisomers by normal methods. However, optically active isomers or diastereoisomers can also be used as starting materials.

The compounds of the invention can also be converted to their pharmacologically acceptable acid addition salts or quaternary ammonium salts with the use of such pharmacologically acceptable acids as acetic, succinic, maleic, fumaric, propionic, lactic, hydrochloric, hydrobromic, sulfuric and phosphoric acids of quaternizing compounds such as the lower alkyl halides, e.g. methyl chloride, ethyl chloride and ethyl bromide.

The new compounds of the invention are valuable pharmacologically, especially in the treatment of heart and circulatory illnesses and are useful in increasing the coronary blood flow. Some of the compounds possess in addition to the heart circulatory activity a broncholytic activity. This latter action is especially noted in the compounds in which $R_8$ and $R_9$ are hydroxyl groups.

The compounds of the invention as indicated are suitable for the production of pharmaceutical compositions. The pharmaceutical compositions or medicaments which contain one or more compounds of the invention or mixtures thereof with other pharmaceutically active materials, as well as with pharmaceutical carriers can be administered enterally, parenterally, orally or perlingually.

The compounds in the form of their salts, e.g. their hydrochloride salts also are useful for curing melamine-formaldehyde resins.

The compounds were tested on isolated guinea pig following the method of Langendorff (Pflüger's Arch. 61, 219, 1889) for their activity on coronary blood flow, contraction amplitude and heart frequency. Their toxicity ($LD_{50}$ in mg./kg.) was tested on mice by oral or intraperitoneal application by the method of Miller and Tainter (Proc. Soc. Exper. Biol. a Med. 57, 261, 1944).

The compounds of the invention in the Langendorff heart test exhibit an increase in coronary blood flow in the dosage area of 5 to 500 μg./heart. At the same time there is an increase in the contraction amplitude. The compounds are therefore suited to improve both the performance and the blood flow of the heart muscle.

Metabolitic studies on the Langendorff heart have shown that the increase in the contraction amplitude is accompanied by an increased concentration of the energy producing foundation and improved utilization thereof.

The dosage range from 5 to 500 μg./heart is based on the isolated Langendorff-heart.

The dosage rate upon intravenous administration to animals, for example dogs, is in the range of 0.5 to 50 mg./kg. body weight for pharmacological activity.

The pharmacological application of the compounds follows customary standard procedures as are used with the known heart-circulatory active compounds. As indicated the administration can be enteral, parenteral, oral or perlingual.

Pharmacological tests of the compounds for the evaluation of the activity can be carried out with papaverin as the comparison substance.

The compounds of the invention of general Formula I can be produced in known way either by (a) reacting a compound of general formula

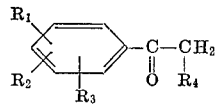　　II with a compound of the general formula

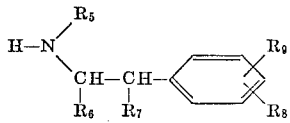　　III together with formaldehyde or a formaldehyde producing substance, or (b) reacting a compound of the general formula

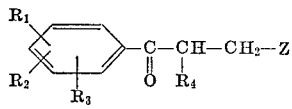　　IV with a compound of the general formula

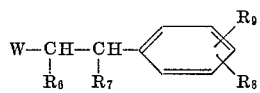　　V where Z and W are different from each other and one is a halogen atom and the other is the group —NHR₅, in the presence of a basic substance, or (c) reacting a compound of the general formula

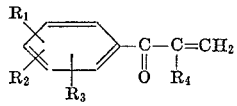　　VI or the corresponding Mannich base of the general formula

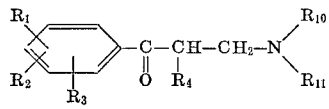　　VII where $R_{10}$ and $R_{11}$ are lower alkyl groups, e.g. methyl, ethyl, propyl, butyl or amyl, with a compound of general Formula III, or (d) reacting a compound of the general formula

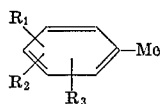　　VIII where Me is alkali metal, e.g. sodium or potassium, or the residue —MgCl, —MgBr or —MgI, with a compound of the general formula

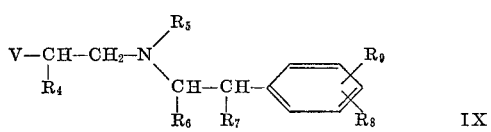　　IX where V is either a cyanide group or the group —COHal where Hal is either chlorine or bromine, and if desired the bases obtained according to processes (a) through (d) are converted in known way to their acid addition salts or quaternary ammonium salts.

Examples of compounds having Formula II are 3-methoxyacetophenone,
4-hydroxyacetophenone,
3-nitro acetophenone,
4-nitro propiophenone,
4-chloro acetophenone,
3-hydroxybutyrophenone,
3-ethoxy-acetophenone,
3,4-dihydroxypropiophenone,
3-pentoxyacetophenone.

Examples of compounds having Formula III are 2-(4-tert. butylphenyl)-2-hydroxyethylamine (and the corresponding hydrochloride salt), 1-(4-hydroxyphenyl)-1-hydroxy-propyl-(2)-amine (and the corresponding hydrochloride salt), 2-(4-isopropylphenyl)-2-hydroxyethyltmine (and the corresponding hydrochloride salt), 2-(4-amylphenyl)-2-hydroxyethylamine hydrochloride, ethyl-2-(3-methoxyphenyl)-ethylamine hydrochloride, amyl-2-(3,4-di-hydroxyphenyl)-2-hydroxyethylamine hydrochloride, 2-(3-ethyl-4-chlorophenyl)-2-hydroxy isopropylamine hydrochloride.

Examples of compounds having Formula IV are

β-chloropropionphenone,
β-chloro-4-methoxypropionphenone,
β-chloro-2-hydroxypropiophenone,
α-ethyl-β-bromo-3-hydroxypropiophenone,
β-chloro-4-nitro propiophenone,
β-amino-2-hydroxypropiophenone.

Examples of compounds within general Formula V are methyl-[2-(4-hydroxyphenyl)-2-hydroxyethyl]-amine,
noradrenalin(2-[3,4-dihydroxyphenyl)-2-hydroxyethyl]
noradrenalin (2-[3,4-dihydroxyphenyl)-2-hydroxyethyl] amine),
ethyl-[2-(3-chloro-4-hydroxyphenyl)-isopropylamine,
2-(3-hydroxy-4-ethoxyphenyl)-2-hydroxyethylamine.

Examples of compounds within general Formula VI are phenyl vinyl ketone (acrylophenone), 4-hydroxyphenyl isopropenyl ketone, 2,3,4-trihydroxyphenyl vinyl ketone, 3-propoxy-4-hydroxyphenyl vinyl ketone, 3-methoxyacrylophenone.

Examples of compounds within general Formula VII are

β-dimethylamino-4-chloropropiophenone.HCl,
β-dimethylamino-4-methylpropiophenone.HCl,
β-dimethylaminopropiophenone (and its hydrochloride),
β-diethylamino-4-hydroxypropiophenone,
β-methyl amylamino-3-hydroxy-4-chloropropiophenone,
β-dimethylamino-3-methoxy propiophenone.HCl,
β-dimethylamino-4-methoxypropiophenone.HCl.

Examples of compounds within Formula VIII are 4-hydroxyphenyl sodium, 3-methoxyphenyl sodium, 3,4-dimethoxyphenyl potassium, phenyl magnesium chloride, 4-hydroxy-phenyl-magnesium iodide, 2-methoxy-phenyl magnesium iodide.

Examples of compounds within Formula IX are β-[2-(4-tert. butylphenyl)-2-hydroxyethylamino] propionitrile, β-[2-(4-tert. butylphenyl) - 2-hydroxyethylamino-propionitrile, β-[2-(4-tert. butylphenyl)-2-hydroxyethylamino]-propionylchloride.

Process (a) is usually carried out at a temperature between 20 and 150° C. As solvents there can be used alcohols, e.g. methyl alcohol, ethyl alcohol and isopropyl alcohol, dioxane, glacial acetic acid or the like.

Process (b) is usually carried out at an elevated temperature, preferably between 80 and 140° C. in a solvent such as alcohols, e.g. methyl alcohol, ethyl alcohol and isopropyl alcohols, ethers, e.g. dibutyl ether, dimethyl formamide or the like. As the basic material there can be used alkali alcoholates, e.g. sodium ethylate and potassium methylate, alkali amides, e.g. sodamide, alkali carbonates, e.g. sodium carbonates, e.g. sodium carbonate and potassium carbonate, tertiary amines, e.g. tributylamine and dimethylaniline, alkali metal or alkaline earth metal hydroxides, e.g. sodium hydroxide, potassium hydroxide and calcium hydroxide, etc.

Process (c) is generally carried out when an unsaturated ketone is used at a temperature between 20 and 80° C. in an inert solvent, for example ether, acetone, dioxane or chloroform while if the corresponding Mannich base VII is used, which in the reaction changes to the unsaturated ketone of Formula VI as an intermediate, the reaction temperature employed is between 30 and

EXAMPLE 1

β-[2-(4-tert.-butylphenyl)-2-hydroxy-ethylamino] 3-methoxypropiophenone

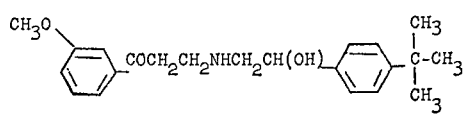

17 grams (0.113 mole) of 3-methoxy-acetophenone, 3.4 grams (0.113 mole) of paraformaldehyde and 26 grams (0.113 mole) of 2-(4-tert.-butylphenyl)-2-hydroxyethylamine.HCl were boiled in 30 ml. of isopropanol for 2 hours under reflux. After 1 hour an additional 3.4 grams of formaldehyde were added. The solvent was distilled off and the hydrochloride crystallized with acetone and recrystallized from isopropanol. Yield 14.5 grams. M.P. 160° C.

EXAMPLE 2

β-[2-(4-tert.-butylphenyl)-2-hydroxyethylamino] 4-hydroxypropiophenone

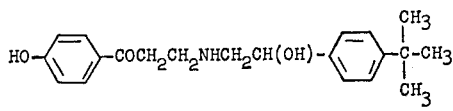

20.4 grams (0.15 mole) of 4-hydroxy-acetophenone, 4.5 grams (about 0.15 mole) of paraformaldehyde and 34.4 grams (0.15 mole) of 2-(4-tert.-butylphenyl)-2-hydroxyethylamine.HCl were reacted in 100 ml. of isopropanol for 2 hours at reflux and after 1 hour a further 4.5 grams of paraformaldehyde were added and the product worked up as in Example 1. Yield 9 grams of the hydrochloride salt, M.P. 194° C.

EXAMPLE 3

β-[2-(4-tert.-butylphenyl)-2-hydroxyethylamino] propiophenone

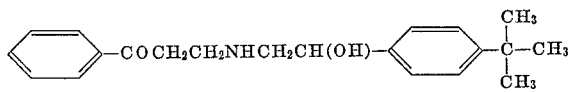

18 grams (0.15 mole) of acetophenone, 4.5 grams (0.15 mole) of paraformaldehyde and 34.4 grams (0.15 mole) of 2 - (4 - tert. - butylphenyl) - 2 - hydroxyethylamine.HCl were boiled in 45 ml. of isopropanol for 2 hours. After an additional 4.5 grams of paraformaldehyde were added. The solvent was distilled off, the hydrochloride crystallized with acetone and recrystallized from isopropanol. Yield 8 grams. M.P. 184° C.

EXAMPLE 4

β-[2-(4-isopropylphenyl)-2-hydroxy-ethylamino] 3-methoxy propiophenone

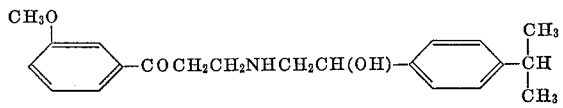

7.5 grams (0.05 mole) of 3-methoxy-acetophenone, 3 grams (0.1 mole) of paraformaldehyde and 10.1 grams (0.05 mole) of 2-(4-isopropylphenyl)-2-hydroxyethylamine.HCl were boiled for 2 hours in 25 ml. of isopropanol under reflux. The solvent was distilled off and the residue crystallized with ethyl acetate. The hydrochloric acid salt obtained was recrystallized from isopropanol. Yield 5 grams. M.P. 154–155° C.

EXAMPLE 5

β-[Methyl-2-(4-hydroxyphenyl)-2-hydroxyethylamino]-propiophenone

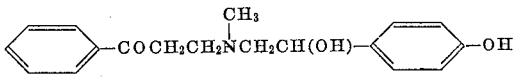

25 grams (0.15 mole) of methyl-[2-(4-hydroxyphenyl)-2-hydroxyethyl]-amine were dissolved in 60 ml. of isopropanol and after the addition of 25.2 grams (0.15 mole) of β-chloropropiophenone were heated for 1 hour on the water bath. The reaction mixture was stirred with 100 ml. of acetone and the precipitated hydrochloride salt recrystallized from ethanol. Yield 36 grams. M.P. 157–158° C.

EXAMPLE 6

β-[2-(3,4-dihydroxyphenyl)-2-hydroxyethylamino] propiophenone

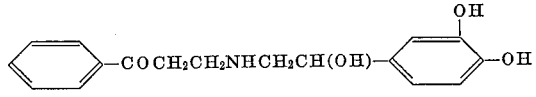

16.9 grams (0.1 mole) of noradrenaline were dissolved in 80 ml. of dimethylformamide and after the addition of 16.9 grams (0.1 mole) of β-chloropropiophenone heated for 2 hours on the water bath. After cooling 200 ml. of ether were added, the sirypy precipitated hydrochloride salt washed twice with 100 ml. of ether and dissolved in 200 ml. of isopropanol. After 24 hours 18 grams of the salt precipitated which was recrystallized from 96% ethyl alcohol. M.P. 165–166° C.

EXAMPLE 7

β-[2-(3,4-dihydroxyphenyl)-2-hydroxyethylamino]-4-methoxypropiophenone

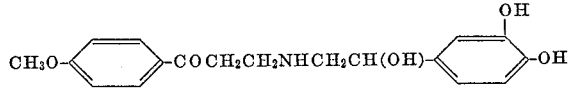

33.8 grams (0.2 mole) of noradrenaline and 39.6 grams (0.2 mole) of β-chloro-4-methoxypropiophenone were reacted in 160 ml. of dimethyl foramide in a manner analogous to Example 6 and worked up. The hydrochloride salt was recrystallized from 80% ethyl alcohol. Yield 17 grams. M.P. 195–196° C.

EXAMPLE 8

β-[2-(3,4-dihydroxyphenyl)-2-hydroxyethylamino]-2 hydroxypropiophenone

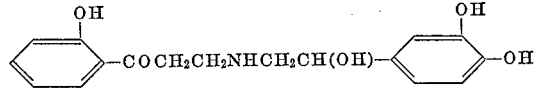

16.9 grams (0.1 mole) of noradrenaline and 18.5 gram (0.1 mole) of β-chloro-2-hydroxypropionphenone were reacted in 80 ml. of dimethyl formamide and worked up in a manner analogous to Example 6. The hydrochloride salt was recrystallized from ethanol. Yield 4.5 grams. M.P. 158–160° C.

EXAMPLE 9

β-[2-(4-tert.-butylphenyl)-2-hydroxyethylamino]-3-hydroxy-propiophenone

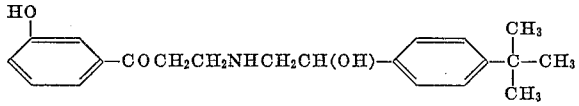

6.5 grams (0.0478 mole) of 3-hydroxy-acetophenone, 1.45 plus 1.45 grams (0.0483 mole) of paraformaldehyde and 11 grams (0.0478 mole) of 2-((4-tert.-butylphenyl)-2-hydroxyethylamine.HCl were reacted in 100 ml. of isopropanol and worked up in a manner analogous to Example 3. The hydrochloride was recrystallized from isopropanol. Yield 2 grams. M.P. 193° C.

EXAMPLE 10

β-[1-(4-hydroxyphenyl)-1-hydroxy-propyl-(2)-amino]-3-methoxy-propiophenone

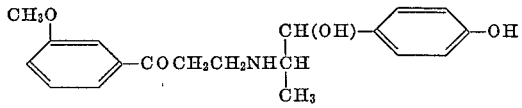

29.3 grams (0.195 mole) of 3-methoxy-acetophenone, 7.2 grams (0.24 mole) of paraformaldehyde and 30.6 grams (0.15 mole) of 4-hydroxynorephedrine.HCl were boiled in 150 ml. of isopropanol for 4 hours under reflux. The solvent was distilled off and the residue was treated with 150 ml. of methylethylketone. The crystalline hydrochloride was recrystallized from ethanol. Yield 12.5 grams. M.P. 172–174° C.

EXAMPLE 11

β-[1-(4-hydroxyphenyl)-1-hydroxy-propyl-(2)-amino]-3-hydroxy-5-methoxy-propiophenone

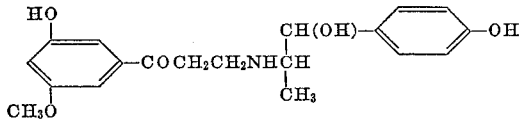

16.6 grams (0.1 mole) of 3-hydroxy-5-methoxy-acetophenone, 3,6 grams (0.12 mole) of paraformaldehyde and 20.4 grams (0.1 mole) of 4-hydroxynorephedrine.HCl were boiled in 8 ml. of isopropanol for 3 hours under reflux. After cooling the hydrochloride precipitated. It was purified by extraction with hot methanol. Yield 18 grams. M.P. 206–208° C.

EXAMPLE 12

β-[1-(4-hydroxyphenyl)-1-hydroxy-propyl-(2)]-3-nitro-propiophenone

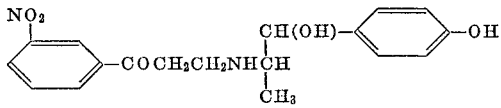

16.5 grams (0.1 mole) of 3-nitroacetophenone, 6 grams (0.2 mole) of paraformaldehyde and 20.3 grams (0.1 mole) of 4-hydroxy-norephedrine.HCl were boiled in 200 ml. of isopropanol for 4 hours under reflux. During the reaction the hydrochloride salt precipitated. After filtration it was washed with water and acetone and recrystallized from methanol. Yield 3 grams. M.P. 195° C.

EXAMPLE 13

β-[2-(4-tert.-butylphenyl)-2-hydroxyethylamino] propiophenone

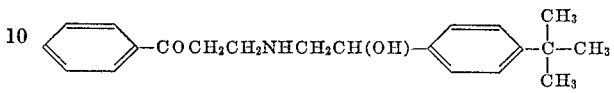

To a solution of 4 grams (20.7 mmole) of 2-(4-tert.-butylphenyl) - 2 - hydroxyethylamine were added 4.43 grams (20.7 mmole) of β-dimethylamino-propiophenone·HCl dissolved in 15 ml. of water. The reaction mixture was stirred at 50° C. for 15 minutes. The solid base precipitated upon cooling. It was purified by recrystallization from isopropanol. Yield 2.5 grams. M.P. 144° C.

A solution of the base in acetone was treated with HCl to precipitate the hydrochloride which was recrystallized from isopropanol. M.P. 184° C.

What is claimed is:

1. A compound selected from the group consisting of compounds having the formula

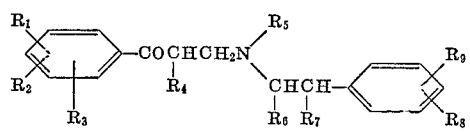

where $R_1$, $R_2$ and $R_3$ are hydrogen, chlorine, hydroxyl, lower alkoxy or nitro, $R_4$ is hydrogen, methyl or ethyl, $R_5$ is hydrogen or methyl, $R_6$ is hydrogen or methyl, $R_7$ is hydrogen or hydroxyl, $R_8$ is hydrogen, lower alkyl, lower alkoxy, hydroxyl or halogen and $R_9$ is hydroxyl or lower alkyl of at least three carbon atoms and their pharmacologically acceptable acid addition salts and their pharmacologically acceptable quaternary ammonium salts.

2. A compound according to claim 1 wherein $R_7$ is hydroxyl.

3. A compound according to claim 2 wherein $R_1$ and $R_2$ are hydrogen, $R_3$ is hydrogen, methoxy or hydroxyl, $R_4$ is hydrogen, $R_5$ is hydrogen or methyl, $R_6$ is hydrogen.

4. A compound according to claim 3 wherein $R_8$ is hydrogen or hydroxyl.

5. A compound according to claim 4 wherein $R_8$ is hydrogen and $R_9$ is lower alkyl of at least 3 carbon atoms.

6. A compound according to claim 4 wherein $R_8$ is hydrogen or hydroxyl and $R_9$ is hydroxyl.

7. A compound according to claim 1 wherein $R_9$ is alkyl of at least 3 carbon atoms.

8. A compound according to claim 7 wherein $R_9$ is alkyl of 3 to 4 carbon atoms.

9. A compound according to claim 1 wherein $R_8$ and $R_9$ are both hydroxyl.

10. A compound according to claim 1 wherein $R_9$ is hydroxyl.

11. β-[2-(4 - tert.-butylphenyl)-2-hydroxy-ethylamino]-3-methoxy-propiophenone.

12. β-[2-(4 - tert.-butylphenyl)-2-hydroxy-ethylamino]-3-hydroxy-propiophenone.

13. β-[2-(3,4-dihydroxyphenyl) - 2 - hydroxy-ethylamino]-propiophenone.

14. β-[2-(3,4-dihydroxyphenyl) - 2 - hydroxy-ethylamino]-4-methoxy-propiophenone.

15. β-[2-(3,4-dihydroxyphenyl) - 2 - hydroxy-ethylamino]-2-hydroxy-propiophenone.

16. β-[1-(4-hydroxyphenyl) - 1 - hydroxy-propyl-(2)-amino]-3-methoxy-propiophenone.

17. β-[1-(4-hydroxyphenyl) - 1 - hydroxy-propyl-(2)-amino]-3-hydroxy-5-methoxy-propiophenone.

References Cited

UNITED STATES PATENTS 3,225,095  12/1965  Thiele _____ 260—570.5
3,337,546   8/1967  Malatestinic et al. _ 260—570.5 X

FOREIGN PATENTS 1,447,529   6/1966  France _____ 260—570.5

ROBERT V. HINES, Primary Examiner

U.S. Cl. X.R.

260—465 E, 501.1, 501.18, 567.6 M, 570.6, 570.8, 592; 424—329, 330